June 5, 1934.                H. ERNST ET AL                1,961,514
                             AUTOMATIC LUBRICATOR
                             Filed June 30, 1932
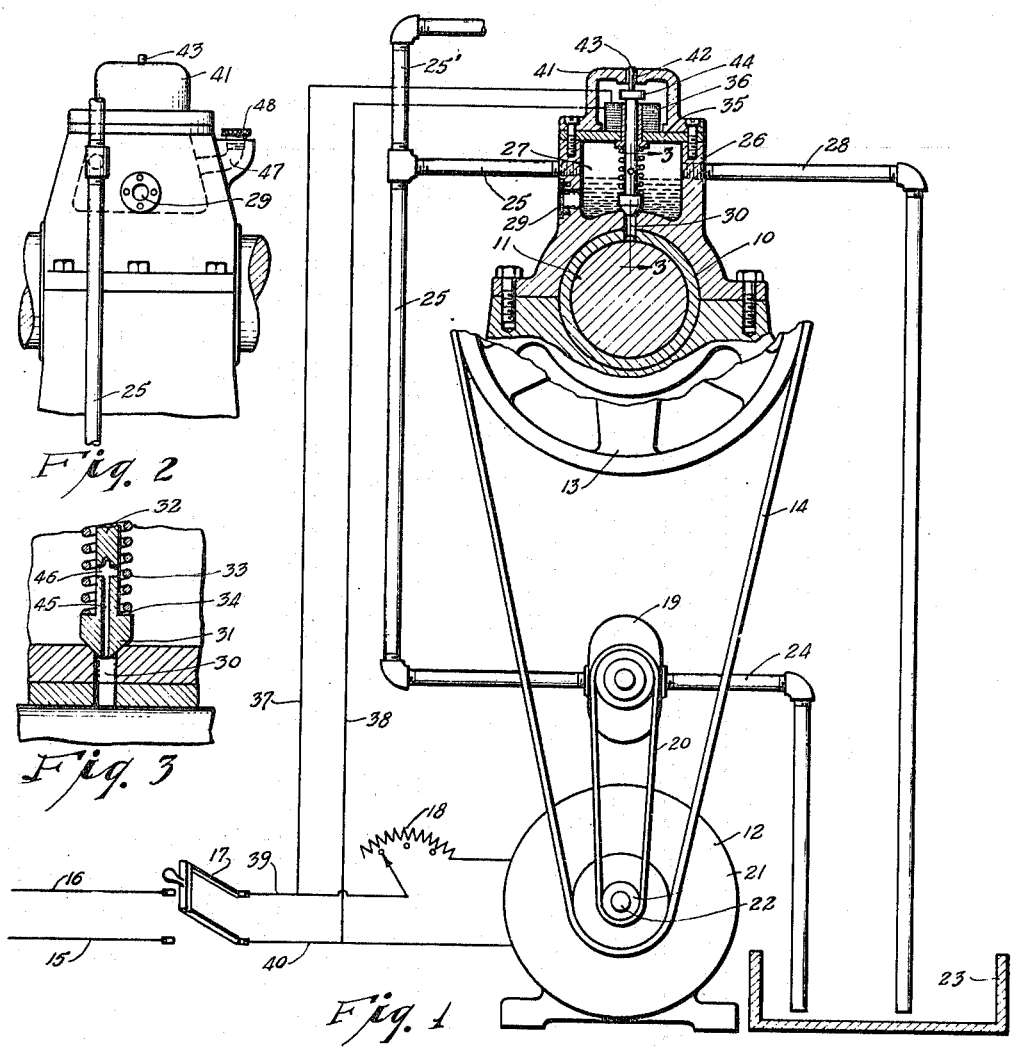
Inventor
HANS ERNST
ALBERT H. DALL
By AHK Parsons
Attorney Patented June 5, 1934

1,961,514

UNITED STATES PATENT OFFICE 1,961,514

AUTOMATIC LUBRICATOR

Hans Ernst and Albert H. Dall, Cincinnati, Ohio, assignors to The Cincinnati Milling Machine Company, Cincinnati, Ohio, a corporation of Ohio Application June 30, 1932, Serial No. 620,197

7 Claims. (Cl. 184—7)

This invention relates to improved means for effecting lubrication of parts remotely located from the pressure source of lubricant supply.

In many types of machines the main working part such as a tool or work carrying spindle, is remotely located from the prime mover and lubricating pump due to the fact that these latter parts are usually located in the lower part of the machine. Consequently when the machine is first started, a considerable time elapses before the lubricating pump starts to deliver lubricant to the remotely located bearings in the upper part of the machine with the result that these parts may become over-heated and damage result before the proper amount of lubricant is delivered thereto.

One of the objects of this invention is to obviate the above difficulties by providing a lubricating system which will deliver lubricant to the remotely located bearings of the machine immediately upon energization of the machine's prime mover.

Another object of this invention is to provide a lubricating system which will automatically and instantly deliver lubricant to the main bearings of the machine immediately upon initiation of rotation of the parts journaled therein, thus eliminating the necessity of the operator's attention to this detail.

A further object of this invention is to provide an auxiliary lubricant reservoir adjacent remotely located bearings of a machine for serving the bearings during actuation of the prime mover, and mechanism for automatically terminating the flow upon disconnection of the prime mover from its source of power.

An additional object of this invention is to provide an auxiliary reservoir in combination with an automatic lubricating system, which will automatically deliver lubricant to the bearings in case of failure of said system.

Other objects and advantages of the present invention should be readily apparent by reference to the following specification considered in conjunction with the accompanying drawing illustrative of one embodiment thereof, but it will be understood that any modifications may be made in the specific structural details thereof within the scope of the appended claims without departing from or exceeding the spirit of the invention.

Referring to the drawing in which like reference numerals indicate like or similar parts:

Figure 1 is an elevational view illustrating the principles of this invention.

Figure 2 is a side elevation of the bearing and lubricant reservoir connected therewith.

Figure 3 is a detailed section as viewed on the line 3—3 of Figure 1.

Figure 4 is a view showing the manner of electrically connecting the operating solenoid to a three-phase system.

In Figure 1 the reference numeral 10 indicates the bearing for a main spindle 11 which may be considered to represent the main working spindle of a machine tool and which is remotely located with respect to its prime mover, the latter being indicated by the reference numeral 12 and usually comprising an electric motor. The spindle 11 may be provided with a suitable actuator such as a pulley 13 positively connected therewith, the pulley in turn being operatively coupled with the prime mover 12 by suitable means such as a belt 14 for constant speed actuation; or through a variable speed transmission not shown for variable speed actuation thereof.

The prime mover in the present instance has been illustrated as an electric motor and, if of the direct current type, may be supplied from power lines 15 and 16. It will be understood that the prime mover may be any type that may be supplied from power lines, other than that shown, such as hydraulic or steam without departing from the principles of this invention.

Suitable connecting means, such as a switch 17, may be utilized for connecting the motor to its power supply lines, and if desired a rheostat 18 may be utilized for starting purposes.

It is general practice in machine design and more particularly in connection with machine tools for which this invention is particularly adaptable, to place the lubricating pump in the lower part of the machine adjacent the lubricant reservoir in order that the pump will be primed at all times for withdrawing lubricant from a sump or reservoir. This also facilitates connection of the pump with the prime mover for high speed actuation thereby.

Such a pump is represented by the reference numeral 19 and is directly connected, as by a belt 20, to a small pulley 21 located on the shaft 22 of the prime mover. A suitable reservoir 23 is usually provided from which the oil is drawn through a pipe 24 by the pump and discharged under pressure into the delivery or distributing pipe 25. Since this delivery pipe extends upward to the top of the machine, it will be seen that considerable time will elapse after starting of the prime mover before the pump will withdraw sufficient fluid from the reservoir and force the same to the upper levels of the machine because after the previous shut-down of the machine the oil in the line will have drained back to the reservoir.

The upper part of the bearing 10 is provided with a bearing cap 26 in which is formed an auxiliary reservoir 27. The distributor pipe 25 is connected to the side wall of this housing and near the top thereof so that the lubricant will discharge into the auxiliary reservoir to fill same. An over-flow pipe 28 is connected to the auxiliary reservoir, preferably at the same height as the delivery pipe, whereby, after the reservoir has been filled to the height of the delivery pipe, the excess will return to the lower reservoir. If so desired, a sight glass 29 may be inserted in the wall of the auxiliary reservoir to indicate the ullage thereof to the operator. A branch 25' may be provided for supplying lubricant to other parts of the machine, and to other bearings for the main spindle which may be similar to the one shown herein.

A channel 30 is located in the floor of the reservoir 27 for conducting the lubricant to the spindle bearing. The upper end of this channel is closed by a tapered valve member 31, Figure 3, formed on the end of a vertical plunger 32 and normally held in a closed position by a spring 33 interposed between the shoulder 34 formed on the valve portion 31 and the top wall 35 of the housing 26. The plunger 32 is composed of suitable magnetic material whereby the same may be passed through a solenoid 36 for actuation thereby. The solenoid serves to lift the plunger automatically upon starting of the prime mover, and to this end is connected by branch lines 37 and 38 to the motor lines 39 and 40 so that when these lines are respectively connected to the power lines 16 and 15 for effecting actuation of the prime mover the solenoid will be energized to effect lifting of the plunger.

The solenoid may be covered with a removable cover plate 41 having an aperture 42 in the top thereof through which a non-magnetic pin 43 inserted in the top of the plunger is free to pass upon elevation of the plunger. The top of this pin is arranged to be flush with the top of the solenoid cover plate when the valve is in a closed position and therefore not visible to the operator. But upon energization of the solenoid causing lifting of the plunger, the pin will project above the housing, as shown in Figure 2, thereby indicating to the operator that the valve has properly opened to admit lubricant to the bearing. A member 44 is threaded on the upper end of the plunger for axial adjustment to determine the amount of lift to be imparted to the plunger by the solenoid and thereby the flow per unit of time to the bearing.

If for any reason the solenoid should fail to maintain the plunger in a withdrawn position during operation of the machine, means have been provided for insuring lubrication of the bearing even in this emergency. This means comprises an axial bore 45 formed in the lower end of the plunger intersecting a cross bore 46 formed therein, the cross bore being at such height from the lower end of the plunger, that when the plunger is in a normally raised position, the cross bore will be above the normal level of the fluid so that the tapered portion 31 will determine the amount of lubricant delivered to the bearing. Upon failure of the solenoid causing the plunger to drop, the cross bore 46 will pass beneath the surface of the lubricant in the reservoir thereby permitting the oil to pass through the axial bore 45 to the bearing, even although the valve portion 31 has moved to a closed position.

An opening 47 closed by a cap 48 is formed in the side wall of the reservoir housing for inspection or filling purposes.

From the foregoing it should now be apparent that means have been provided for automatically supplying lubricant to a bearing which is remotely located from the source of lubricant supply immediately upon coupling of the prime mover for power actuation. It will be noted that this device is also provided with sight means for indicating whether oil is being properly delivered to the reservoir and also with additional means for indicating whether the lubricant controlling valve is opened or closed.

In Figure 4, a prime mover 12' of the alternating current type is illustrated having lines 49, 50 and 51 adapted to be connected to main power lines 53, 54 and 55 through the closing of a switch 52. In this type of power circuit, the lines 37 and 38 of the solenoid 36 may be connected across any phase of the three-phase system such as to the lines 49 and 51 as illustrated herein. If a plurality of operating solenoids are provided for a plurality of remotely located bearings, these solenoids may be connected across different phases of the system in order to equalize the resistance thereof.

That which is claimed is:

1. An automatic lubricating system for a bearing having a rotatable part therein, and a prime mover for effecting actuation of the part including an auxiliary lubricant reservoir associated with the bearing, a solenoid operated valve for determining lubricant flow from the reservoir to said bearing, means to effect simultaneously the operation of said valve and said prime mover whereby the rotatable part will be lubricated immediately upon rotation thereof, a pump, a main reservoir, and means coupling the pump to the prime mover for actuation thereby to effect replenishing of the auxiliary reservoir from the main reservoir during operation of the prime mover.

2. An automatic lubricating system for a bearing having a rotatable part therein, a prime mover for effecting rotation of said part including a lubricant reservoir associated with said bearing, a channel for conducting lubricant from the reservoir to said bearing, a valve plunger for closing said channel, an electrical solenoid for moving said valve to an open position, internal channel means in the valve plunger having a lateral opening which is above the normal level of the fluid in said reservoir when the plunger is in an open position, said opening being submerged upon de-energization of the solenoid whereby the lubricant will be delivered temporarily to said bearing after the closing of said valve.

3. A mechanism for effecting lubrication of a bearing having a rotatable part therein and a prime mover for effecting actuation thereof including a cap for said bearing, a lubricant reservoir formed in said cap, a channel extending from the reservoir to said rotatable part, a valve mounted in said channel for determining flow therein, a cover for said reservoir, an electric solenoid supported on said cover for effecting operation of said valve, a cover plate for said solenoid, said valve including a plunger of magnetic material extending axially through the solenoid and a non-magnetic pin secured in the end of said plunger and adapted to be flush with said cover plate when the valve is in a closed position, and means to energize the solenoid upon actuation of the prime mover to effect withdrawal of the plunger and thereby cause lubricant to flow to the bearing, said non-magnetic pin projecting above the cover plate upon withdrawal of the plunger to indicate that the valve is open.

4. In a device of the class described having a prime mover and a part operatively connected to the prime mover for actuation thereby, the combination of means for supplying lubricant to said part including a lubricant reservoir and a pump operatively connected with the prime mover for actuation thereby, said pump having an intake leading from the reservoir and a delivery channel extending to said part, said pump being remotely located with respect to said part whereby upon starting of the prime mover a certain time will elapse before lubricant is supplied to said part by the pump, means in said delivery channel and adjacent said bearing for storing a supply of lubricant from previous operation of the pump, and valve means automatically actuable upon coupling of power to the prime mover for connecting said supply of lubricant to the bearing whereby the bearing will be lubricated during said elapsed time.

5. In a device of the class described having a prime mover and a part operatively connected thereto for actuation thereby, the combination of means for supplying lubricant to said part including a lubricant reservoir, a pump having an intake extending into the reservoir and a delivery channel extending to said part, an auxiliary reservoir associated with said part and connected to said delivery channel for storing a part of said pump delivery upon stoppage of the prime mover, a source of energy for actuating said prime mover, and means operable by said energy upon connection to the prime mover for connecting said auxiliary reservoir to the part whereby the same will be lubricated until a new lubricant flow is established by said pump.

6. In a device of the class described having a prime mover and a part operatively connected to the prime mover for actuation thereby, the combination of means for lubricating said part immediately upon initiation of rotation of the prime mover including a lubricant reservoir closely associated with said part, a pump remotely located with respect to said part and operatively connected with the prime mover, a main lubricant reservoir, an intake extending from the main reservoir to the pump, a delivery channel extending from the pump to the first named reservoir, the delivery of said pump being in excess of the lubricant requirements of said part whereby an excess of lubricant will accumulate in the first named reservoir, an overflow return line extending from the first named reservoir to the main reservoir, and means for automatically connecting the first named reservoir to the part upon initiation of rotation of the prime mover and before flow in the delivery channel is established by said pump.

7. In a device of the class described having a movable part and a prime mover spaced therefrom but operatively connected thereto for actuation thereof, the combination of means for effecting lubrication of said part including a lubricating circuit, a pump in said circuit operatively connected with the prime mover and remotely located with respect to said part, a main lubricant reservoir, a first channel extending from the reservoir to the intake of said pump, a second channel extending from the pump to said part and a return channel extending from the part to the reservoir, an auxiliary reservoir connecting the second channel to the third channel, means connecting the auxiliary reservoir to the bearing, said means including a valve for automatically stopping the flow upon disconnection of power from the prime mover whereby an accumulation will remain in the reservoir while the parts are at rest, said valve means being automatically operable upon reconnection of power to the prime mover to utilize said accumulation until flow is re-established in the circuit by said pump.

HANS ERNST.
ALBERT H. DALL.